(12) United States Patent
Dixon et al.

(10) Patent No.: US 6,987,872 B2
(45) Date of Patent: Jan. 17, 2006

(54) METHOD AND SYSTEM OF CONTRAST MANAGEMENT OF IMAGES USING SIMD INSTRUCTIONS AND SATURATION ARITHMETIC

(75) Inventors: Walter Vincent Dixon, Delanson, NY (US); David Allen Langan, Clifton Park, NY (US)

(73) Assignee: General Electric Company, Niskayuna, NY (US)

(*) Notice: Subject to any disclaimer, the term of this patent is extended or adjusted under 35 U.S.C. 154(b) by 845 days.

(21) Appl. No.: 09/893,065

(22) Filed: Jun. 28, 2001

(65) Prior Publication Data

US 2003/0002725 A1 Jan. 2, 2003

(51) Int. Cl.
*G06K 9/00* (2006.01)

(52) U.S. Cl. ..................................................... 382/128

(58) Field of Classification Search ................ 382/132, 382/304, 274, 128–134; 378/98.2–98.12; 348/229.1, 230.1, 255, 256, 470, 263, 264
See application file for complete search history.

(56) References Cited

U.S. PATENT DOCUMENTS

| | | | |
|---|---|---|---|
| 4,891,757 A * | 1/1990 | Shroy et al. ................ 378/98.7 |
| 5,657,400 A * | 8/1997 | Granfors et al. ............ 382/254 |
| 6,034,789 A * | 3/2000 | Kawai ........................ 358/474 |
| 6,421,772 B1 * | 7/2002 | Maeda et al. ................. 712/11 |
| 6,457,861 B1 * | 10/2002 | Petrick et al. .............. 378/207 |
| 6,477,228 B2 * | 11/2002 | Spahn ......................... 378/62 |
| 2002/0114530 A1 * | 8/2002 | Duarte ....................... 382/254 |

* cited by examiner

*Primary Examiner*—Andrew W. Johns
*Assistant Examiner*—Shervin Nakhjavan
(74) *Attorney, Agent, or Firm*—Jean K. Testa; Christian G. Cabou

(57) ABSTRACT

A method and system of processing raw images for display. First, a processor corrects the raw images with respect to an offset image to generate an offset corrected image. Next, a level of the offset corrected image is adjusted with respect to a gain adjust by employing saturation arithmetic to clip the level of the offset corrected image to generate a gain corrected image. Next, a window of the gain corrected image is adjusted with respect to a reference window to generate an output image. Next, the output image is packed into a register for display.

20 Claims, 13 Drawing Sheets

METHOD AND SYSTEM OF CONTRAST MANAGEMENT OF IMAGES USING SIMD INSTRUCTIONS AND SATURATION ARITHMETIC

BACKGROUND OF THE INVENTION

This invention generally relating to processing of video images and, in particular, to method of processing raw video images using single instruction, multiple data (SIMD) instructions and saturation arithmetic to achieve contrast management of the images.

In certain environments, particularly in medical imaging, display technology may have a more limited dynamic range than the video sensors being used to collect the video data images to be displayed. Therefore, it is usually necessary to modify the video signals to correspond the limited dynamic range of the display technology which will be used to display the video signals. In particular, in order to display video data, the dynamic range of the data must be mapped to the dynamic range of the display technology which will be used to display the data. In the past, lookup tables have been used to achieve the mapping, although such tables have processing speed and dynamic range limitations. In addition, the case of high speed video data, specialized hardware may be needed to provide contrast management.

There is a need for a simpler system and method for transforming the video data images so that their dynamic ranges corresponds to the dynamic range of the video display technology which will be used to display the images. There is also a need for such a system and method which linearly transforms the video data, which transformation is less taxing on the processor performing the transformation thereby reducing the processor requirements. There is also a need for such a system and method which linearly transforms the video data, which transformation reduces memory bandwidth requirements. There is also a need for such a system and method which linearly transforms the video data, which transformation clips output of the video range without requiring branches that degrade processor performance.

BRIEF SUMMARY OF THE INVENTION

In one form, the invention comprises a method of processing raw images for display. First, the raw images are corrected with respect to an offset image to generate an offset corrected image. Next, a level of the offset corrected image is adjusted with respect to a gain adjust to generate a gain corrected image. Next, a window of the gain corrected image is adjusted with respect to a reference window to generate an output image.

In another form, the invention includes a system for processing raw images for display comprising a processor. The processor corrects the raw images with respect to an offset image to generate an offset corrected image. The processor adjusts a level of the offset corrected image with respect to a gain adjust to generate a gain corrected image. The processor adjusts a window of the gain corrected image with respect to a reference window to generate an output image.

This method and system of the invention has a number of advantages over the prior art. It avoids the need for lookup tables and specialized hardware for contrast management. It provides a linear transformation which is less taxing on the processor performing the transformation. It requires less bandwidth than systems and methods of the prior art. It clips output to the video range of the display technology by saturation arithmetic while avoiding the need for branches which degrade processor performance.

Other objects and features will be in part apparent and in part pointed out hereinafter.

BRIEF DESCRIPTION OF THE DRAWINGS

Corresponding reference characters indicate corresponding parts throughout the drawings.

BRIEF DESCRIPTION OF THE APPENDICES

Appendix A is an example of a listing of a commented source code (assuming a 512 count wide window) file according to the invention.

Appendix B is a modified example of the listing of the commented source code file of Appendix A in floating point instructions and using prefetch instructions to move the data closer to the processor, i.e., from memory to cache.

DETAILED DESCRIPTION OF THE INVENTION

The invention uses an implementation of a linear transform which exploits SIMD (single instruction multiple data) instruction architecture and avoids branches required to clip output to the video range with saturation arithmetic. One important aspect of the invention is the parallel nature or computational nuances of the image-processing algorithm. The method and system works simultaneously with three different images. A stream of one or more images is acquired by the processor performing the transformation. These images are referred to as raw images. An offset or dark image is also acquired. This image is generated by reading a reference image. For example, in the case of processing x-ray images, this images is generated by reading out the x-ray panel in the absence of any x-rays. The purpose of acquiring this reference image is to remove certain artifacts from the final image. The actual timing and number of offset images depend on the particular application. For example, in current cardiac applications, an initial offset image for the entire sequence is acquired.

The method also uses a gain image. The gain image is a composite image that is acquired as part of system calibration. The method may optionally acquire this image daily, weekly, bi-weekly, etc. The algorithm assumes that this gain image has been previously obtained.

Figure 1:
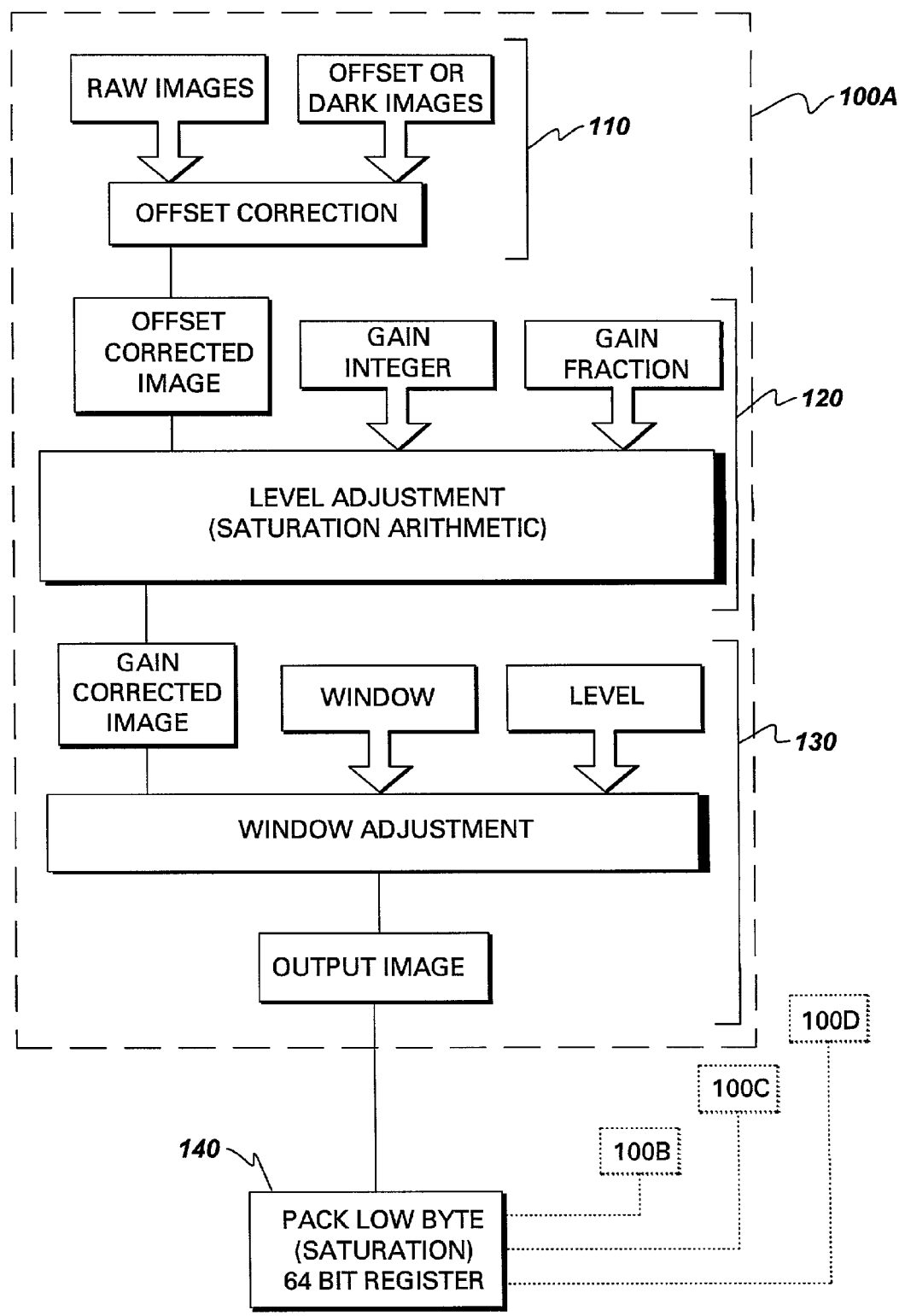
FIG. 1 is a flow diagram illustrating one preferred embodiment of the invention.

Referring to FIG. 1, the invention includes a method 100A of processing raw images for display comprising the steps of:

a first series of steps 110 correcting the raw images with respect to an offset (or dark) image to generate an offset corrected image;

a second series of steps 120 adjusting (by employing saturation arithmetic) a level of the offset corrected image with respect to a gain adjust (such as a gain integer and/or a gain fraction) to generate a gain corrected image;

a third series of steps 130 adjusting a window and/or level of the gain corrected image with respect to a reference window by right shifting to generate an output image; and a fourth series of steps 140 packing the output image into a register for display by the display technology having a dynamic range to which the dynamic range of the raw image has now been mapped.

For a 16 pixel data file, the method 100A is performed on the first 4 pixels while parallel processing method 100B, which is substantially the same as method 100A, is performed on the next 4 bits of the 32 bit data file. The next 4 pixels are processed by parallel processing method 100C, which is substantially the same as method 100A, and the last 4 pixels are processed by parallel processing method 100D, which is substantially the same as method 10A.

Figure 2:
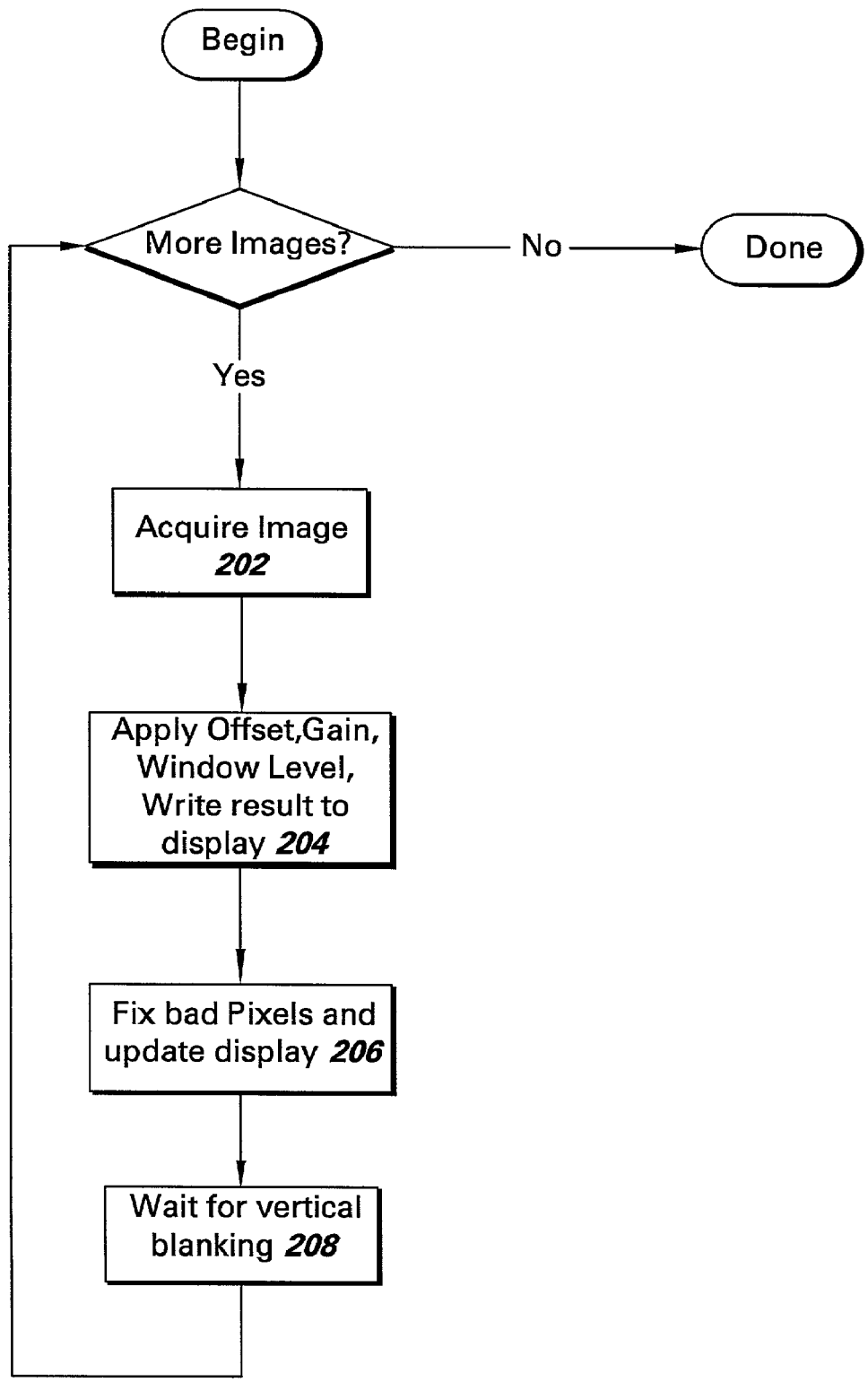
FIG. 2 is a flow chart of a high level view of the overall processing sequence of FIG. 1.
Figure 6:
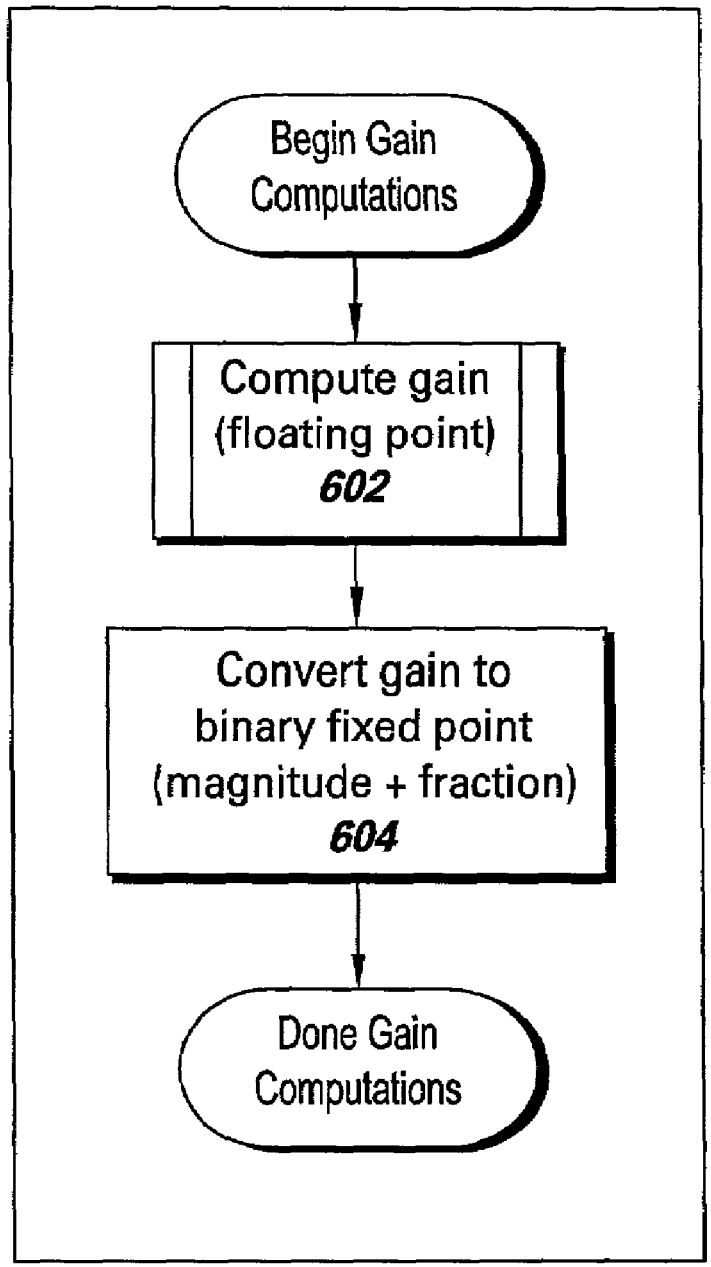
FIG. 6 is a flow chart of a high level view of the gain calibration procedure used by a processor according to FIG. 2 the invention.

In particular as shown in FIG. 2, to begin processing data the gain calibration file of the data to be processed is first acquired at step 202 and then converted to a binary-fixed point file. A binary fixed point file is a file of floating-point numbers wherein each number is converted into an integer portion and a fractional portion. Both portions of the gain are represented as 16-bit integers. FIG. 6 shows a high level view of an exemplary gain calibration. Any type of gain calibration may be employed. For example, the floating-point data file produced by the calibration procedure at step 602 converts the gain to a binary, fixed point representation at step 604.

Next, an offset corrected image is acquired by step 204. The offset corrected image and converted gain image are then rearranged to have 16 offset pixels, followed by 16 integer gain calibration, followed by 16 gain fraction values. The specific order of offset, integer gain, and gain is not important. However, the specific order is important to the performance of the algorithm such that these 48 values should be located in virtually contiguous memory for proper display. In particular, each of the data items must be contiguous and properly aligned. The processor fetches a cache, one line at a time (on Pentium processors versions prior to Pentium IV, a cache line is 32 bytes). If an operation references data that crosses a cache line, there is a significant performance degradation. The spatial proximity of these three quantities is important. If they are located arbitrarily the processor must generate extra instructions to reference the data. If the three data sets are far apart, the processor must use a large offset to reference all three items with a single register. The large offset limits the decode rate of the processor. At step 206, bad pixels are fixed (see FIGS. 7 and 13) and the display is updated. At step 208, the method waits for the next blanking interval to proceed to process the next image, if there are any more images to process.

Figure 3:
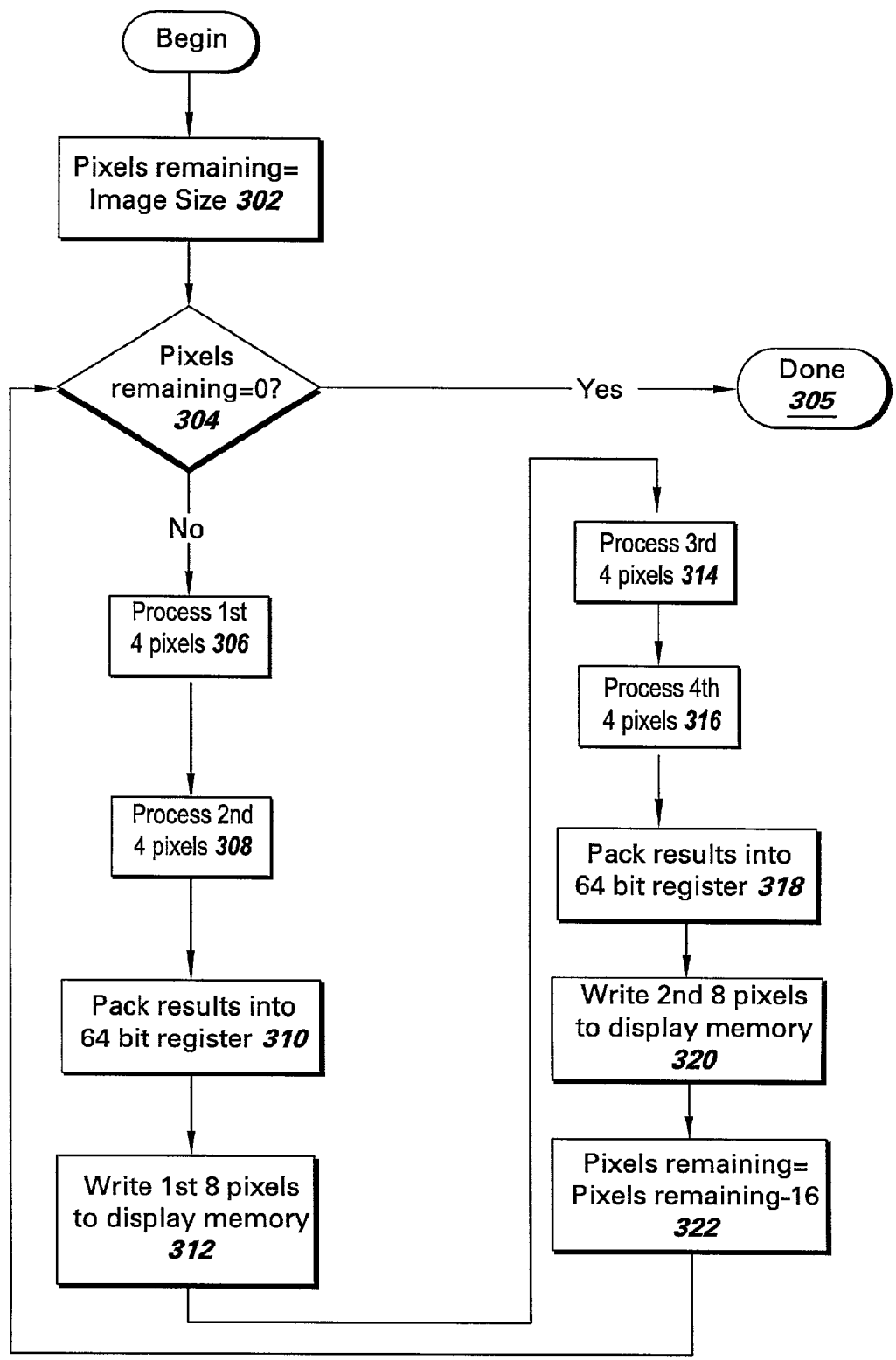
FIG. 3 is a flow chart of the processing sequence of an individual image used by a processor according to the invention.

FIG. 3 shows the overall processing sequence for an individual image. At step 302, the pixels remaining are set equal to the image size which must be a multiple of 16 bits or it must be padded to be a multiple of 16 bits. If zero pixels are remaining as determined by step 304, the method is done at step 305. Otherwise, the first 4 pixels of the offset corrected image are processed as noted above in FIG. 1 to accomplish window and level adjustment by subtraction and shifting, respectively. This corresponds to method 100A. Similarly, the next 4 pixels are processed at step 308 according to method 100B and the results are packed into a 64 bit register at step 310. At this point, the first 8 pixels are provided to the display memory by step 312. This process is then repeated for the last 8 pixels. The next 4 pixels are processed by step 314 (method 100C) followed by the last 4 pixels being processed by step 316 (method 100D). Step 318 packs the results in the 64 bit register and step 320 writes the last 8 pixels to the display memory. Step 322 determines the number of remaining pixels so that step 304 can decide to proceed with step 306 or end with step 305.

Figure 4:
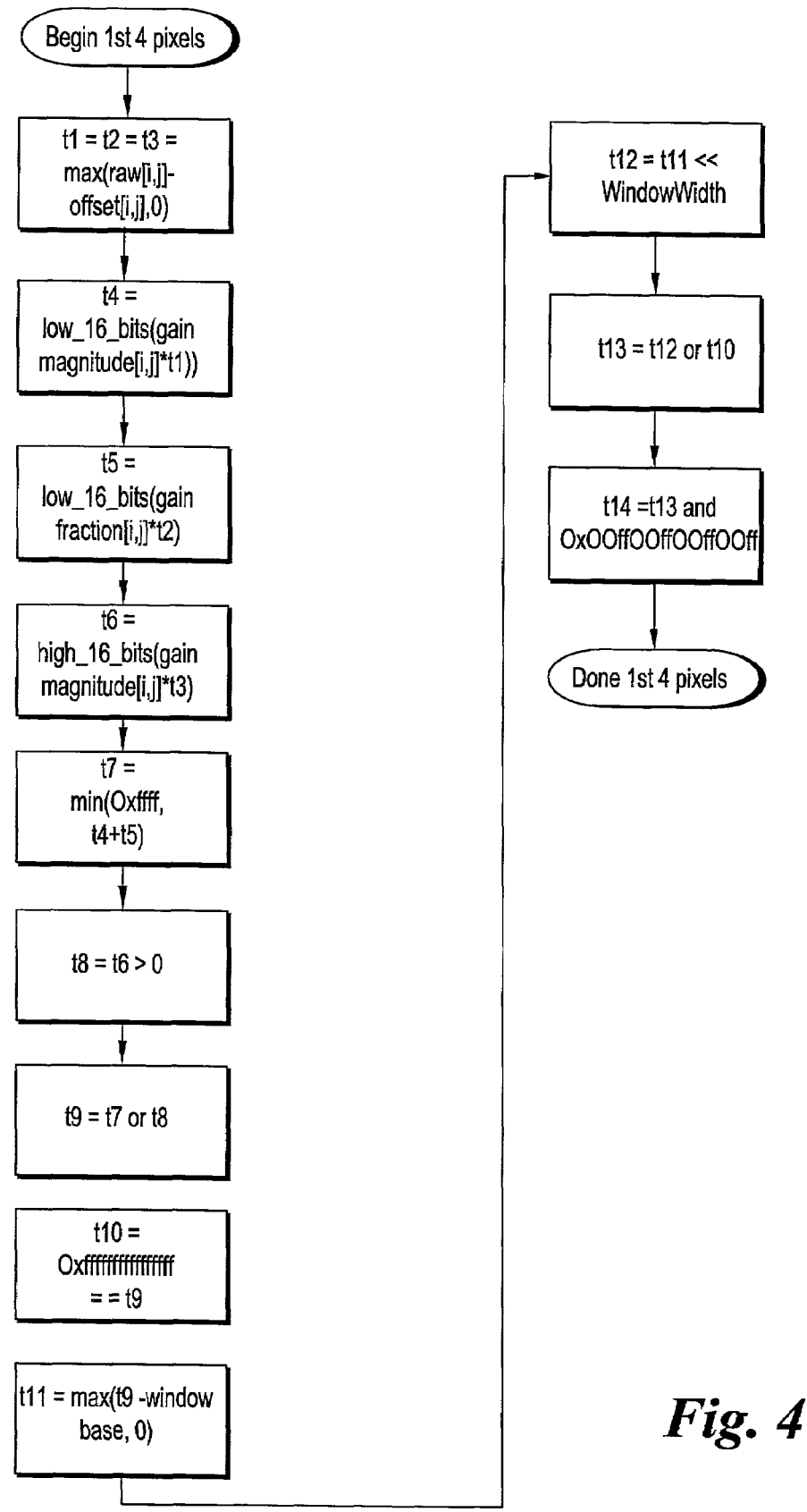
FIG. 4 is a flow chart of the processing details for a first set of 16 pixels processed per iteration according to FIG. 3 of the invention.
Figure 5:
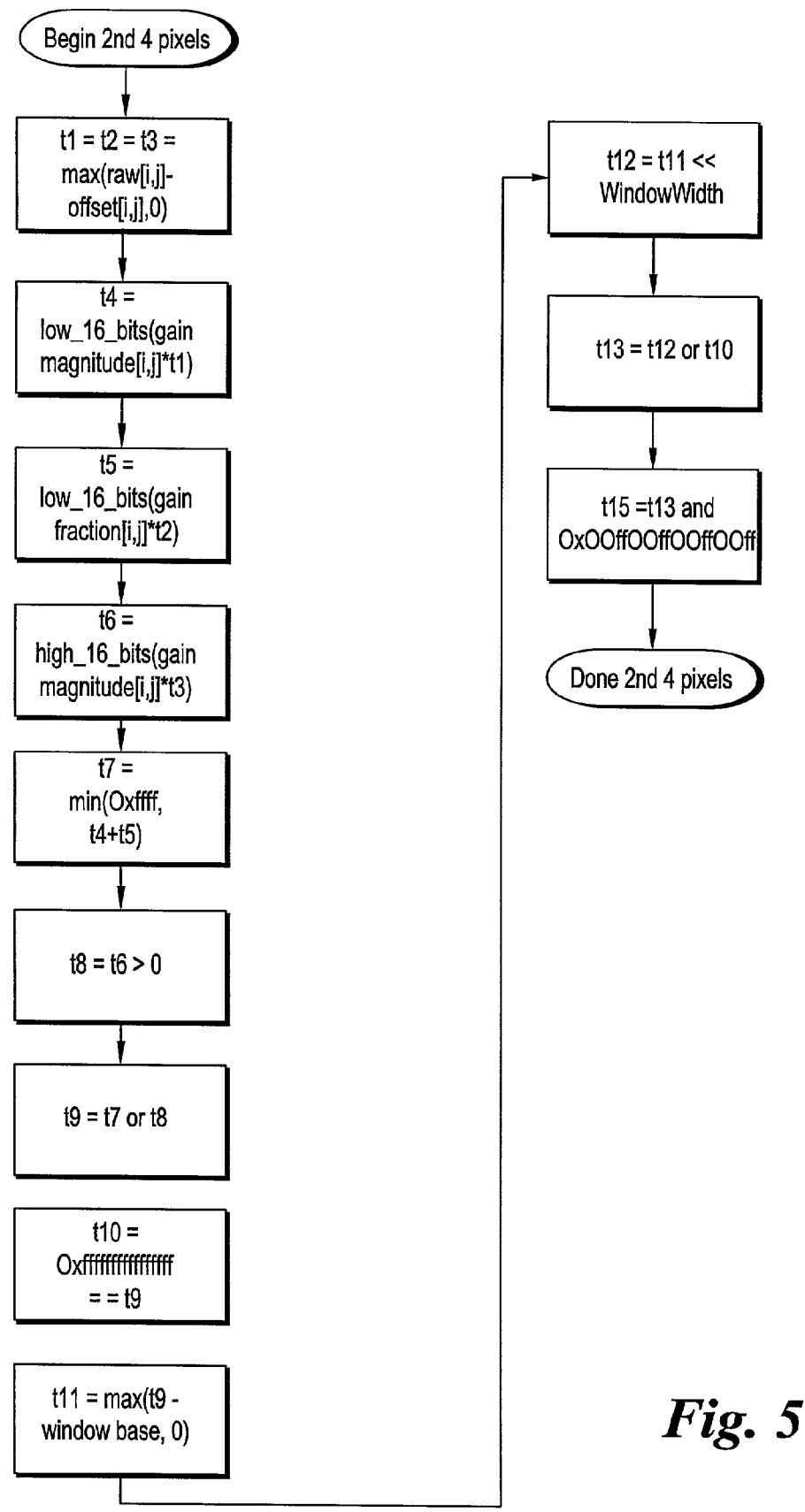
FIG. 5 is a flow chart of the processing details for a second set of 16 pixels processed per iteration according to FIG. 3 of the invention.

The loop in FIG. 3 illustrates how a processor processes 16 pixels per iteration. One cache line at a time is processed. A cache line is 32 bytes (on PENTIUM processors prior to PENTIUM IV). The raw and offset images contain 2 byte pixels; therefore one cache line =16 pixels. The four pixels correspond to an MMX register width of 8 bytes. FIGS. 4 and 5 show the processing details for the first and second sets of four pixels within the image processing loop. Processing for the third set of 4 pixels is identical to the first set as shown in FIG. 4. Processing of the fourth set of 4 pixels is identical to the second set as shown in FIG. 5.

In general, the method of the invention processes raw images wherein the raw image comprises an N (e.g., 64) pixel sub-image, wherein the N pixel sub-image is divided into M (e.g., 4) sets of N/M (e.g., 16 pixels each), wherein N is an integer multiple of M, and wherein the first through fourth steps are applied to each of the M sets and the M sets are simultaneously processed in parallel by the first through fourth steps.

Image Processing Library

The image processing library which is the source of the code used by the processor to process the images according to the invention provides basic image processing and contrast management for the platform method. To support time-critical processing for cardiac, fluoro-rad, and similar medical modalities, one aspect of the invention optimizes the implementation of this library. The routines utilize the Pentium processor's MMX instruction set. For floating point instructions (see Appendix B), SSE registers of the processor are also used. This hardware feature allows the invention to process as many as four pixels with one arithmetic instruction.

Basic library services include offset correction 110 (FIG. 1), gain correction 120 (FIG. 1), and bad pixel correction 110 (FIG. 1). Specific library routines for each of these operations are provided; these routines accept the address of an input and an output buffer. The image processing for cardiac, fluoro-rad, and similar modalities are memory bandwidth limited. Having separate modules for each operation provides the flexibility one would expect from a data acquisition platform, but the necessary extra memory reads and writes can limit performance. The library also includes a generic processing routine optimized to minimize the memory bandwidth. Logically, contrast management is a display function but such a separation would require additional memory copies. The invention also may include a window-level operation in the generic processing and also provides a separate window-level routine for non time-critical applications (see window adjustment 130; FIG. 1).

Offset Correction

FIG. 1 illustrates the architecture of the offset correction data flow, particularly step 110, as noted above. Offset correction subtracts a previously acquired offset image from the current light image. This operation utilizes the Pentium processor's MMX instructions. Four pixels from a previously acquired offset image are subtracted from four pixels from the current raw image using an unsigned subtract with saturation instruction. Should an offset pixel be larger than the corresponding pixel from the raw image, the result is forced to zero by the saturation operation.

Gain Correction 120

FIG. 1 illustrates the architecture of the gain correction processing, particularly step 120, as noted above. FIG. 6 illustrates one preferred implementation of the gain calibration according to the invention. Gain calibration multiplies a previously acquired, offset corrected image by an experimentally determined gain correction.

Figure 9:
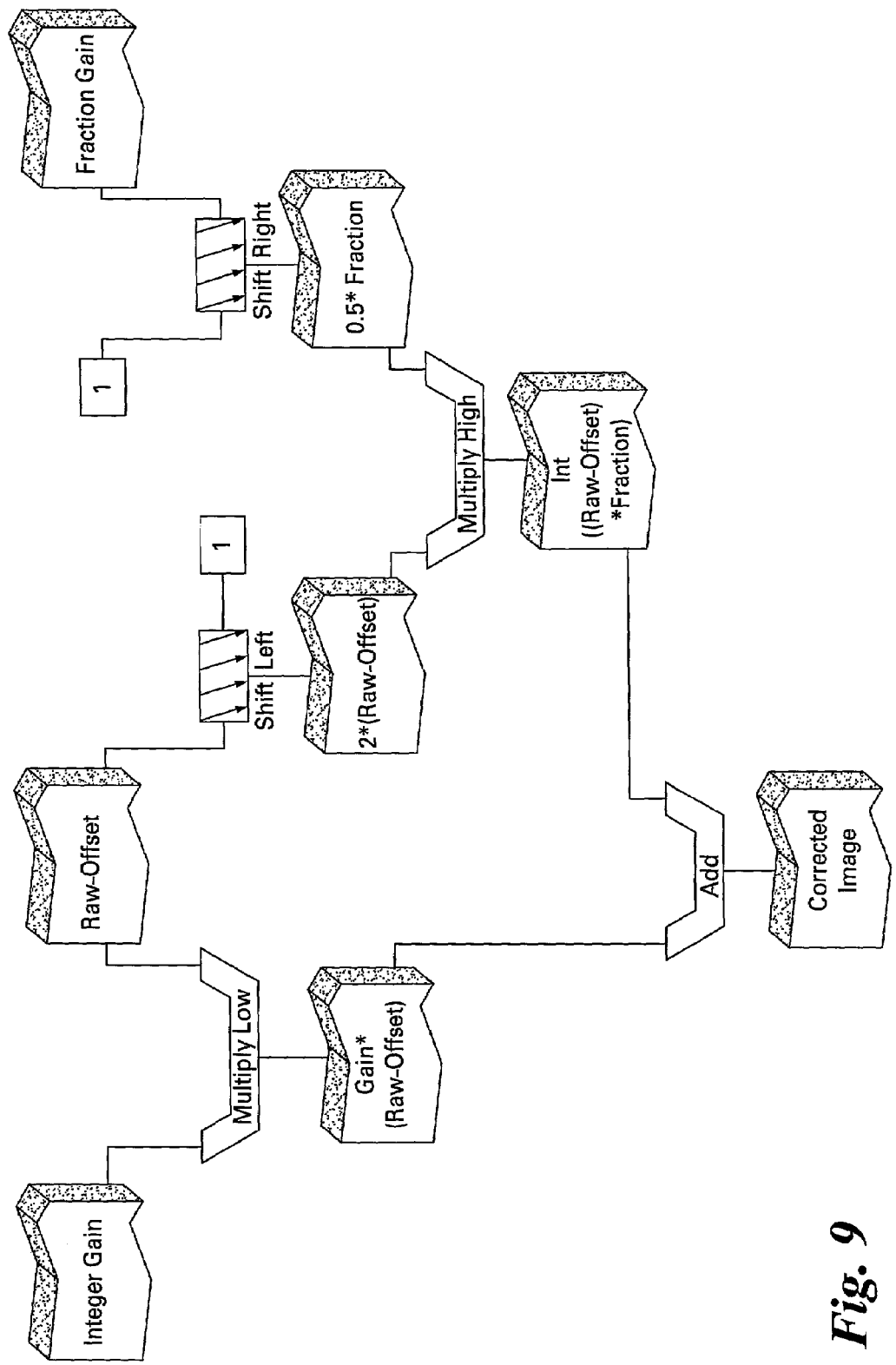
FIG. 9 illustrates the data flow for the gain correction according to FIG. 6 the invention.
Figure 12:
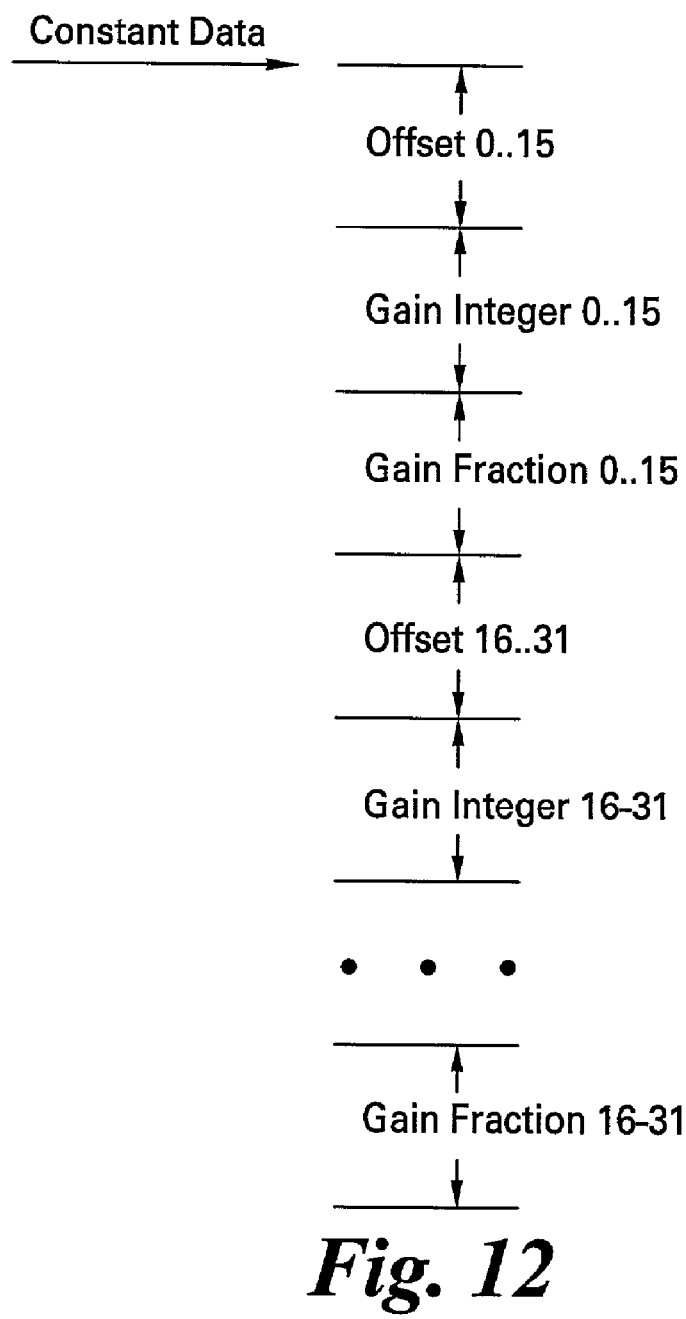
FIG. 12 illustrates the format of optimized processing of a constant data structure according to FIGS. 6 and 9 of the invention.

FIGS. 9 and 12 illustrate in more detail the data flow for the gain correction generally illustrated in FIG. 6. The gain is divided into an integer and fractional part prior to performing the gain correction. The gain correction as a floating point number is initially computed. The integer part of the gain the then computed by truncating the floating point gain. Next, the gain fraction is computed by subtracting the integer gain from the original floating point value and multiplying the result by $2^{15}$. Scaling is important so as not to have overflow errors in implementing the binary fixed point multiply. Next, the product of gain and input image (normally, the offset corrected image) is computed using 16-bit integer operations. The order of computation may vary or the computations may be performed simultaneously.

Window—Level Transformation 130

FIG. 1 illustrates the architecture of the window-level transformation, particularly step 130, as noted above. This transform allows an application to manage image brightness and contrast. Data from the detectors has a larger dynamic range than a monitor can display. The window-level transform provides a mapping from detector resolution to display resolution.

Figure 11:
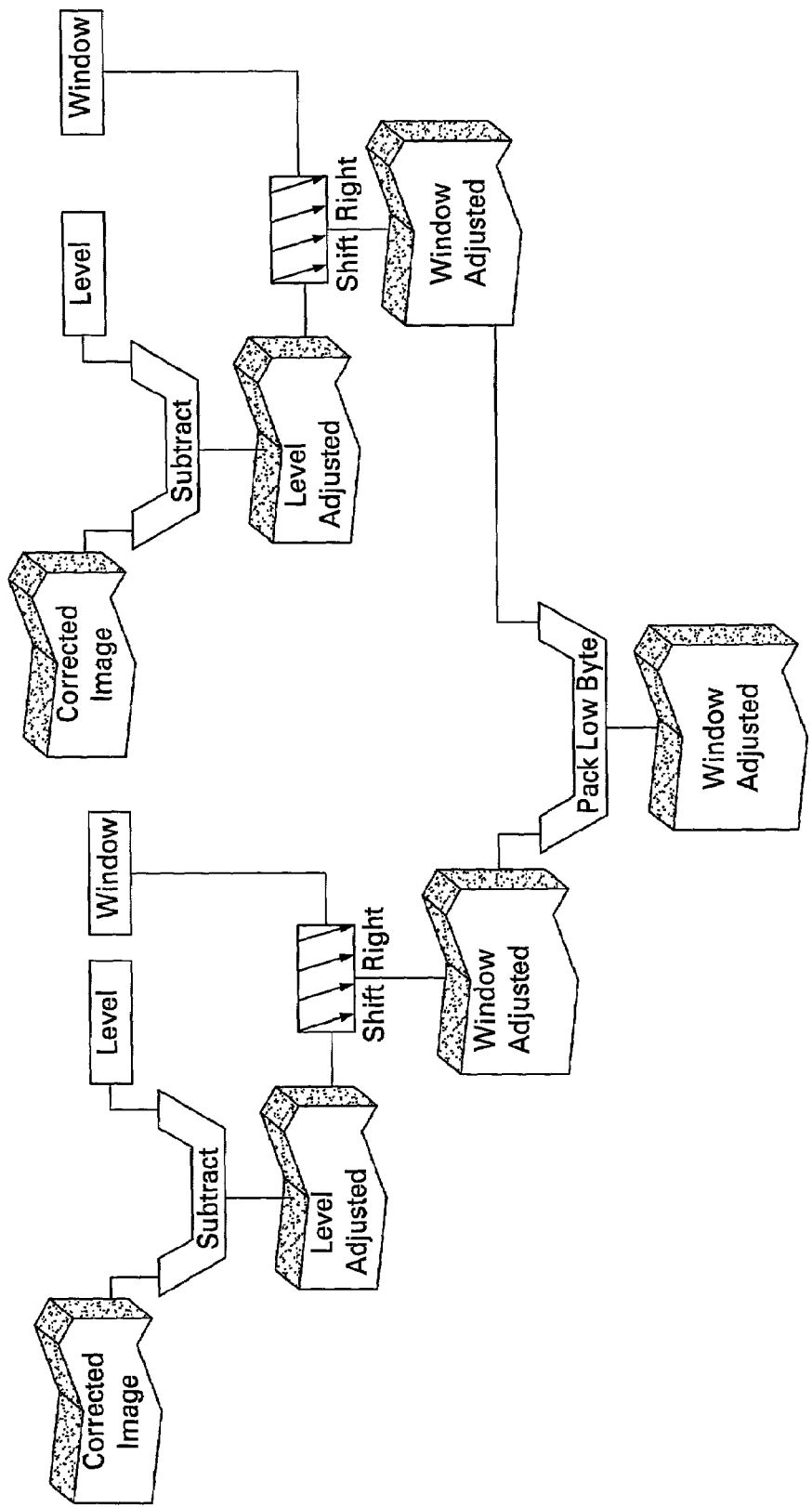
FIG. 11 is a flow chart illustrating window-level processing according to the invention.

FIG. 11 illustrates window-level processing. The library may provide a stand-alone version of this algorithm as well as a version built in to the cardiac/fluoro-rad processing. The data flow is identical for these two cases. In the optimized version, the image is not explicitly from memory.

Bad Pixel Processing

Figure 7:
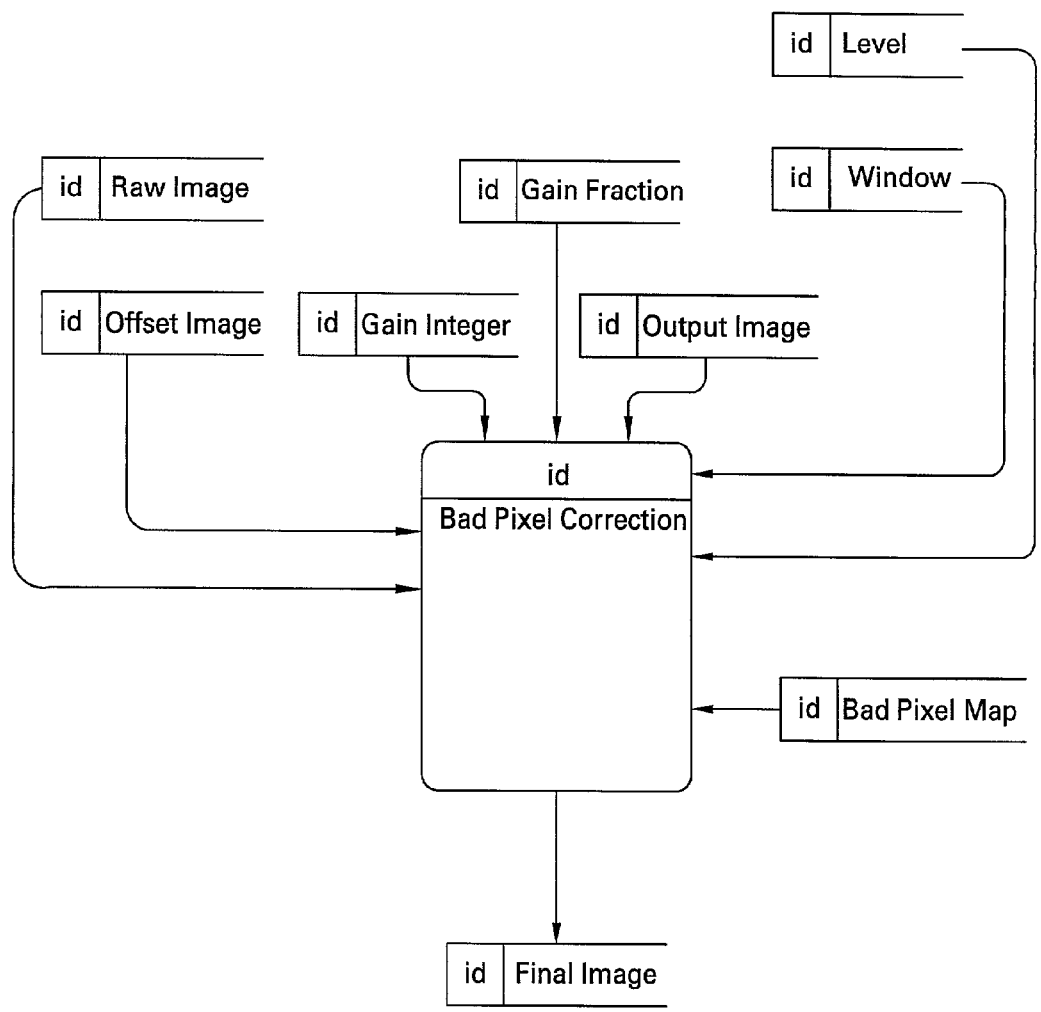
FIG. 7 illustrates the architecture for optional bad-pixel processing according to the invention.
Figure 13:
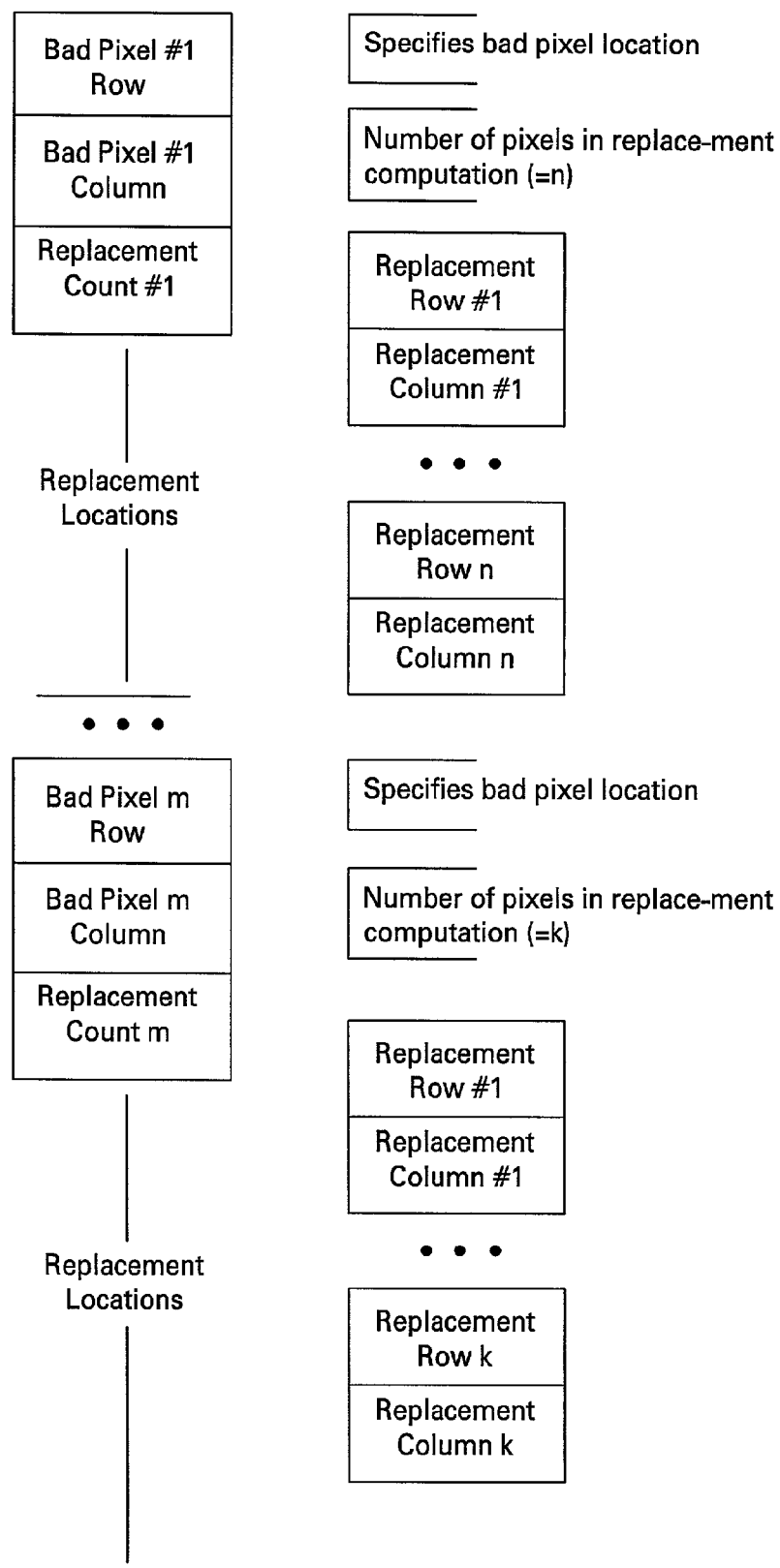
FIG. 13 illustrates the format of the bad pixel map of FIG. 7.

FIG. 7 illustrates the architecture of the optional bad-pixel processing. All detectors will most likely have bad pixels. Normally, a correction algorithm is applied to panels used in final products. A bad-pixel correction algorithm is included in the tester platform to support image quality measurements. One logical way to implement bad-pixel processing is to correct the raw-image, but because of a requirement to save this data, it is difficult to tolerate the overhead of making a copy. To solve this problem, all the other processing steps on the entire raw image are performed and then these calculations for the bad pixels are repeated. FIG. 13 shows the format of the bad pixel map. This structure permits implementing a very general bad pixel replacement policy.

Cardiac/Fluoro-rad Processing

Figure 8:
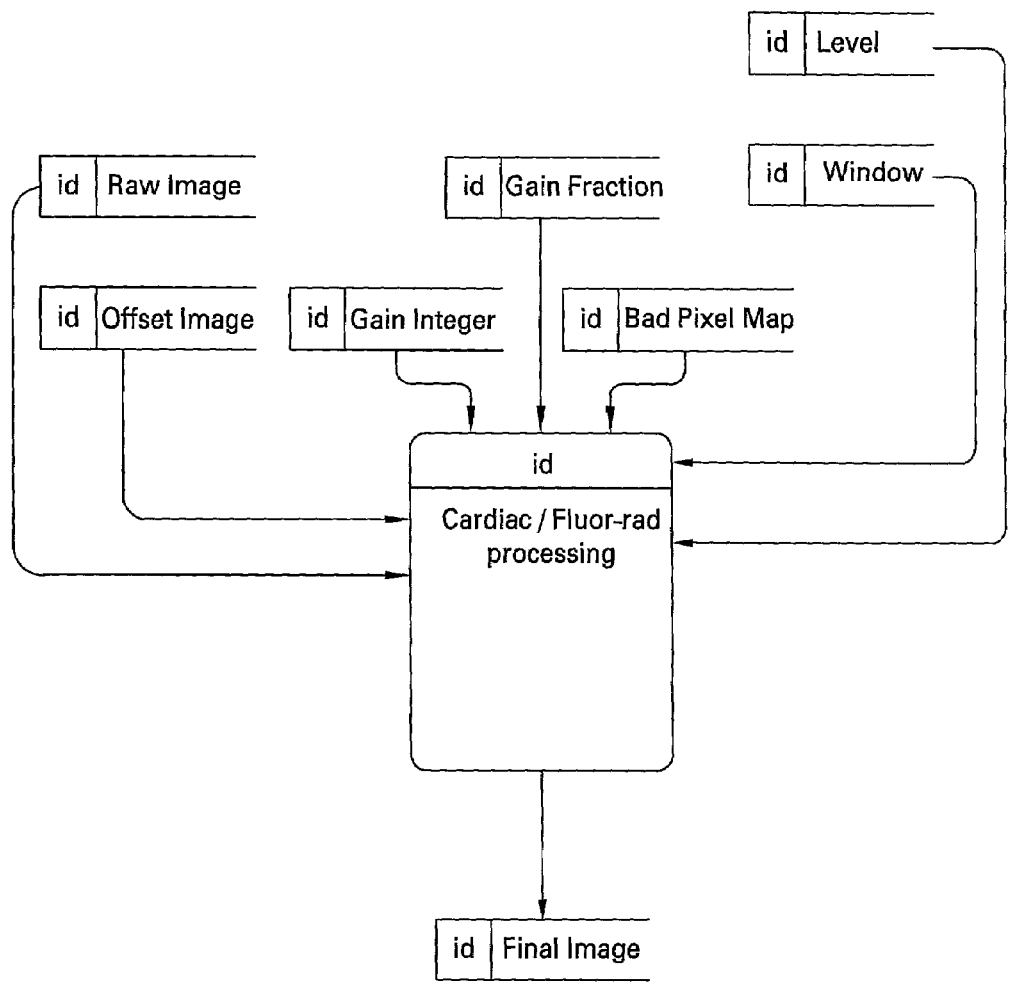
FIG. 8 illustrates the architecture for cardiac and fluoro-rad processing.

FIG. 8 illustrates the architecture for cardiac and fluoro-rad processing. Although the same algorithms are used to process this data, all the processing steps are applied at the same time to avoid extra memory accesses.

Figure 10:
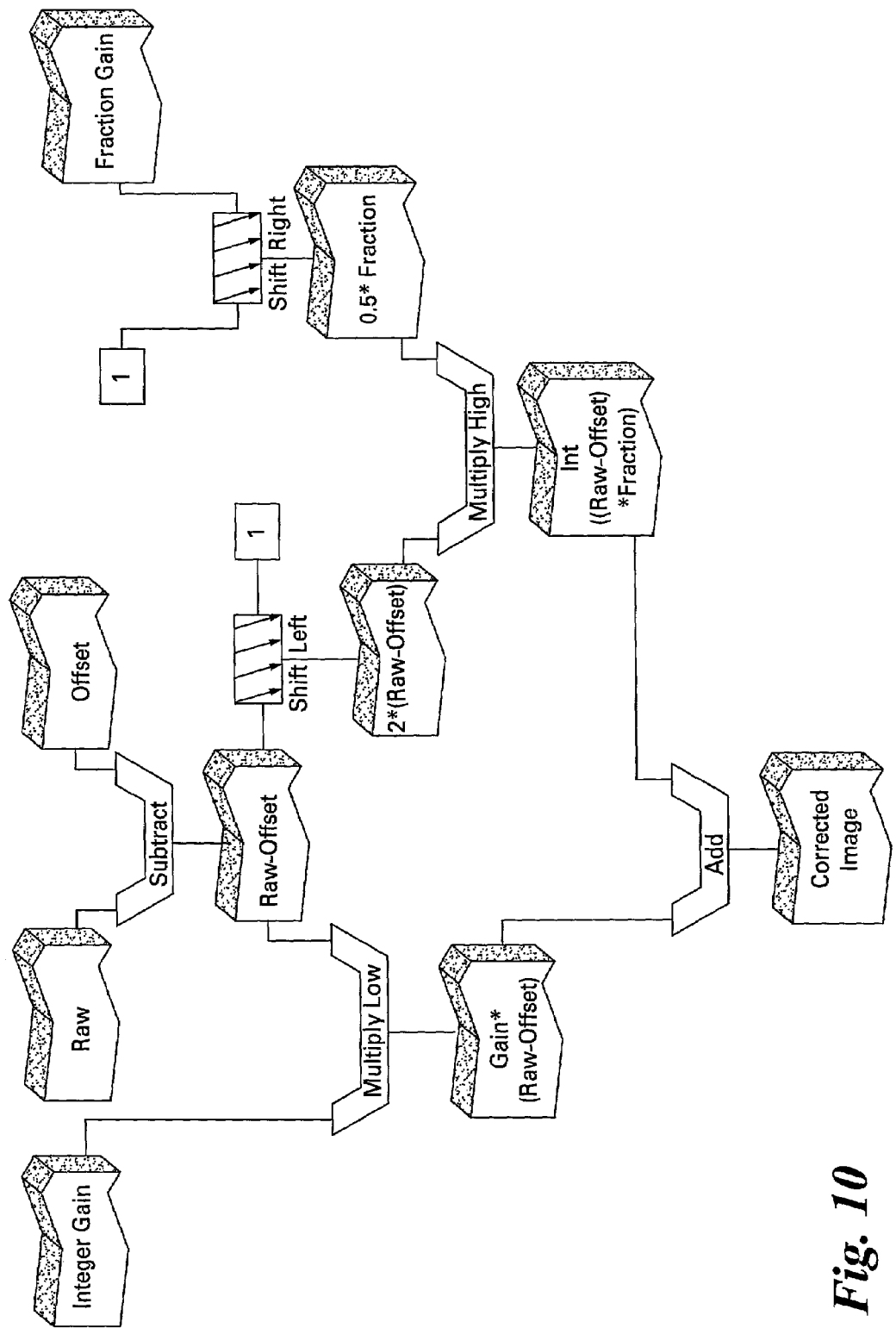
FIG. 10 illustrates one preferred embodiment for optimized data flow for cardio and fluoro-rad processing according to FIG. 8 the invention.

FIG. 10 illustrates the optimized data flow for cardiac/fluoro-rad processing. All the processing steps are combined to eliminate memory accesses. The window-level transform is processed as a separate step, but for efficiency it may be combined with the gain and offset corrections.

Resources

The following identifies and describes the resources external to the design entity that may be used by the entity to perform its function. Resources may take on a number of forms. For example, physical devices may include one or more of the following: hardware devices, user interface devices, networks, printers, disk partitions and memory banks. As another example, software services may include operating systems services and/or Commercial Off-The-Shelf Software (COTS). As yet another example, the processing resources may include one or more of the following: CPU cycles, memory allocation and disk and network bandwidth management and/or allocation.

For each resource identified, there are several interaction rules and methods that must be specified. In particular, the usage characteristics of the resources must be described, such as: performance characteristics such as access time, bandwidth, or process time; and sizing characteristics such as disk space, memory allocation, quantity and physical sizes of buffers.

There are also some special considerations for real time environments. When working in a real time environment, time is treated as a resource so that the real time constraints should be specified.

Image Data Parameters

Based on the nature of the design entity, the following image data parameters may be applicable.

Input Image

The input image consists of an array of unsigned short (16-bit) pixels. The most significant bit(s) will be zero; the dynamic range of the data depends on the panel. The base address can be aligned on at least a 16-byte boundary. Page alignment (4096-byte boundary) is generally required and not preferable because of the way in which memory is managed. For example, 16 byte alignment is required for performance. The DFN driver provides page aligned buffers.

Offset Image

The library works with two different offset image formats. The stand-alone offset processing expects an array of unsigned short (16-bit) pixels with a 16-byte boundary minimum alignment. The optimized processing works with the constant data structure described in a subsequent section.

Integer Gain

The library works with two different integer gain formats. The stand-alone gain processing expects an array of unsigned short (16-bit) integer gains with a 16-byte boundary minimum alignment. The optimized processing works with the constant data structure described in a subsequent section.

Fraction Gain

The library works with two different fraction gain formats. The stand-alone gain processing expects an array of unsigned short (16-bit) fraction gains with a 16-byte boundary minimum alignment. The optimized processing works with the constant data structure described in a subsequent section.

Constant Data

The optimized processing works with a constant data structure. There is a library routine that builds this structure from an unsigned short (16-bit) offset array and a 32-bit floating point gain array. The library routine will return a page aligned constant data structure. FIG. 12 describes the format of this.

Commented Source Code

Appendix A is an example of a listing of a commented source code file according to the invention. There are two include files referenced in this listing. The first is a file required by the compiler. The second file defines function prototypes. There is a library of image processing functions. The listing of Appendix A describes the processing according to the invention. Note that the listing assumes a window width of 512. In contrast, the flow charts in the figure above have been modified to show a general window width. The window width is restricted to be a power of 2 so that the software shifts rather than divides. The details of the image processing has been described above.

Appendix B is a modified example of the listing of the commented source code file of Appendix A in floating point instructions and using prefetch instructions. The code in Appendix B does not do the contrast management (window/level adjust) as does the code of Appendix A, so that it is useful with any software that does not require the window level adjustment. The changes as embodied in the code of Appendix B tend to make the processing according the invention faster than processing by the code of Appendix A, but the code of Appendix A runs fast enough.

The code of Appendix B differs from the code in Appendix A in two significant ways: (1) the code of Appendix B uses PENTIUM SSE (floating point) instructions, and (2) the code of Appendix B uses prefetch instructions to move the data closer to the processor, i.e., from memory to cache, so that the data is in L1 or L2 cache when it is referenced. These two changes require a PENTIUM III or newer processor; they are not valid for a PENTIUM II. The code of Appendix A runs on a PENTIUM II processor. There are two benefits derived from using the floating point instructions: (1) the code is shorter and simpler and (2) more processor registers are available. The more data that can be kept in processor registers, the faster that the code will run. Prefetching data increases performance by about 25%.

The code of Appendix A has some other "processing optimizations," such as: (1) the number of points is not required to be a multiple of 16, and (2) the output data is allowed to overwrite the input data. In the code of Appendix A, it was assumed that a 1024×1024 image would always be processed. Appendix B relaxes that restriction by adding a loop at the end to process any extra pixels using scalar operations. Overwriting the input array minimizes memory bandwidth, but is not desirable in all cases.

In view of the above, it will be seen that the several objects of the invention are achieved and other advantageous results attained.

As various changes could be made in the above methods and systems without departing from the scope of the invention, it is intended that all matter contained in the above description and shown in the accompanying drawings shall be interpreted as illustrative and not in a limiting sense.

APPENDIX A

COMMENTED SOURCE CODE (ASSUMES A 512 COUNT WIDE WINDOW)

```
#include <mmintrin.h>
#include "immxlib.h"
//
// Single frame
// Gain and offset interspersed
// Do window level correction
// Intel version
// This code has not been run
```

-continued

```
// from iCorrectImage1a
//
#define OFFSET_OFFSET           0
#define OFFSET_MAGNITUDE        4
#define OFFSET_FRACTION         8
void iCorrectImage4(char*& pszImageProcessingFile)
{
    pszImageProcessingFile = __FILE__;
}
void iCorrectImage4(unsigned short* pwConstant,
                    unsigned short*    pwRawImage,
                    unsigned char*     pbCorrectedImage,
                    unsigned short     wWindowBase,
//                  unsigned char      bWindowSize,
                    size_t             imageSize)
{
    __m64 *mmx_pbCorrectedImage = (__m64*) pbCorrectedImage;
    __m64 const* mmx_pwRawImage = (__m64 const*)pwRawImage;
    __m64 const* mmx_pwConstant = (__m64 const*)pwConstant;
    __m64 t1;
    __m64 t2;
    __m64 t3;
    __m64 t4;
    __m64 t5;
    __m64 t6;
    __m64 t7;
    __m64 t8;
    __m64 t9;
    __m64 t10;
    __m64 t11;
    __m64 t12;
    __m64 t13;
    __m64 t14;
    __m64 t15;
    unsigned short windowBase[4];
    int i;
    for(i=0; i<4; i++)
    {
        windowBase[i] = wWindowBase;
    }
    __m64 tWindowBase = *((__m64 *)windowBase);
    for(i = imageSize; i> 0; i -= 16)
    {
        //
        //      First 4 pixels
        //
        t3 = t2 = t1 = _m_psubsw(*mmx_pwRawImage++,
                mmx_pwConstant[OFFSET_OFFSET]);        //
Iij(t)-Oij
        t4 = _m_pmullw(t1, mmx_pwConstant[OFFSET_MAGNITUDE]);
// Low(Mij*(Iij(t)-Oij))
        t5 = _m_pmulhw(t2, mmx_pwConstant[OFFSET_FRACTION]);    //
High(Fij*(Iij(t)-Oij))
        t6 = _m_pmulhw(t3, mmx_pwConstant[OFFSET_MAGNITUDE]);
// High(Mij*(Iij(t)-Oij))
        t7 = _m_paddsw(t4,t5);
        // Low(Mij*(Iij(t)-Oij)) +    // High(Fij*(Iij(t)-Oij))
        t8 = _m_pcmpgtw(t6,0);
        // check Mij*(Iij(t)-Oij)
                // for overflow
        t9 = _m_por(t7, t8);
    // saturate result on overflow
        t10 = _m_pcmpeqw(0xffffffffffffffff,t9);
remember saturated pixels
        t11 = _m_psubsw(t9, tWindowBase);
        // Rij - Base
        t12 = _m_psrlw(t11, 1);
        // adjust Rij for window
        t13 = _m_por(t12, t10);
        // resaturate result
        t14 = _m_pand(t13, 0x00ff00ff00ff00ff);
'discard msb
        //
        //      Second 4 pixels
        //
        t3 = t2 = t1 = _m_psubsw(*mmx_pwRawImage++,
                mmx_pwConstant[OFFSET_OFFSET+1]);      //
ij+4(t)-Oij+4
        t4 = _m_pmullw(t1, mmx_pwConstant[OFFSET_MAGNITUDE+1]);
```

-continued

```
'/ Low(Mij+4*(Iij+4(t)-Oij+4))
        t5 = _m_pmulhw(t2, mmx_pwConstant[OFFSET_FRACTION+1]);
'/ High(Fij+4*(Iij+4(t)-Oij+4))
        t6 = _m_pmulhw(t3, mmx_pwConstant[OFFSET_MAGNITUDE+1]);
/ High(Mij+4*(Iij+4(t)-Oij+4))
        t7 = _m_paddsw(t4,t5);
        // Low(Mij+4*(Iij+4(t)-Oij+4)) +
            // High(Fij+4*(Iij+4(t)-Oij+4))
        t8 = _m_pcmpgtw(t6,0);
        // check Mij+4*(Iij+4(t)-Oij+4)
            // for overflow
        t9 = _m_por(t7, t8);
    // saturate result on overflow
        t10 = _m_pcmpeqw(0xffffffffffffffff,t9);
// remember saturated pixels
        t11 = _m_psubsw(t9, tWindowBase);
    // Rij+4 - Base
        t12 = _m_psrlw(t11, 1);
    // adjust Rij+4 for window
        t13 = _m_por(t12, t10);
    // resaturate result
        t15 = _m_pand(t13, 0x00ff00ff00ff00ff);
        *mmx_pbCorrectedImage++ = _m_packuswb(t14,t15);
    //
    //      Third 4 pixels
    //
        t3 = t2 = t1 = _m_psubsw(*mmx_pwRawImage++,
                mmx_pwConstant[OFFSET_OFFSET+2]);    //
Iij(t)+8-Oij+8
        t4 = _m_pmullw(t1, mmx_pwConstant[OFFSET_MAGNITUDE+2]);
// Low(Mij+8*(Iij+8(t)-Oij+8))
        t5 = _m_pmulhw(t2, mmx_pwConstant[OFFSET_FRACTION+2]);
// High(Fij+8*(Iij+8(t)-Oij+8))
        t6 = _m_pmulhw(t3, mmx_pwConstant[OFFSET_MAGNITUDE+2]);
// High(Mij+8*(Iij+8(t)-Oij+8))
        t7 = _m_paddsw(t4,t5);
        // Low(Mij+8*(Iij+8(t)-Oij+8)) +
            // High(Fij+8*(Iij+8(t)-Oij+8))
        t8 = _m_pcmpgtw(t6,0);
        // check Mij+8*(Iij+8(t)-Oij+8)
            // for overflow
        t9= _m_por(t7, t8);
    // saturate result on overflow
        t10 = _m_pcmpeqw(0xffffffffffffffff,t9);
remember saturated pixels
        t11 = _m_psubsw(t9, tWindowBase);
    // Rij+8 - Base
        t12= _m_psrlw(t11, 1);
    // adjust Rij+8 for window
        t13 = _m_por(t12, t10);
    // resaturate result
        t14 = _m_pand(t13, 0x00ff00ff00ff00ff);
// discard msb
    //
    //      Fourth 4 pixels
    //
        t3 = t2 = t1 = _m_psubsw(*mmx_pwRawImage++,
                mmx_pwConstant[OFFSET_OFFSET+3]);    //
Iij+12(t)-Oij+12
        t4 = _m_pmullw(t1, mmx_pwConstant[OFFSET_MAGNITUDE+3]);
// Low(Mij+12*(Iij+12(t)-Oij+12))
        t5 = _m_pmulhw(t2, mmx_pwConstant[OFFSET_FRACTION+3]);
// High(Fij+12*(Iij+12(t)-Oij+12))
        t6 = _m_pmulhw(t3, mmx_pwConstant[OFFSET_MAGNITUDE+3]);
// High(Mij+12*(Iij+12(t)-Oij+12))
        mmx_pwConstant += 12;
        t7 = _m_paddsw(t4,t5);
        // Low(Mij+12*(Iij+12(t)-Oij+12)) +
            // High(Fij+12*(Iij+12(t)-Oij+12))
        t8 = _m_pcmpgtw(t6,0);
        // check Mij+12*(Iij+12(t)-Oij+12)
            // for overflow
        t9 = _m_por(t7, t8);
    // saturate result on overflow
        t10 = _m_pcmpeqw(0xffffffffffffffff,t9);
// remember saturated pixels
        t11 = _m_psubsw(t9, tWindowBase);
    // Rij+12 - Base
        t12 = _m_psrlw(t11, 1);
```

```
        // adjust Rij+12 for window
        t13 = __m_por(t12, t10);
        // resaturate result
        t15 = __m_pand(t13, 0x00ff00ff00ff00ff);
        *mmx_pbCorrectedImage++ = __m_packuswb(t14,t15);
    }
    __m_empty();
}
```

APPENDIX B

COMMENTED SOURCE CODE                              USING FLOATING POINT INSTRUCTIONS

```
void
VectorVectorSubtractVectorMultiplyMMX (
    IN int nPoints,
    IN WORD* pwInput,
    IN WORD* pwOffset,
    IN float* pfScale,
    IN OUT WORD* pwOutput
    )
{
    int 1;
    __m64 *mmx_pwInput;
    __m64 *mmx_pwOffset;
    __m128 *mmx_pfScale;
    __m64 *mmx_pwOutput;
    assert(nPoints > 0);
    assert(pwInput != NULL);
    assert(pwOffset != NULL);
    assert(pfScale != NULL);
    assert(pwOutput != NULL);
    //
    // Require 32 byte alignment for all vectors
    //
    assert(IS_32BYTE_ALIGNED(pwInput));
    assert(IS_32BYTE_ALIGNED(pwOffset));
    assert(IS_32BYTE_ALIGNED(pfScale));
    assert(IS_32BYTE_ALIGNED(pwOutput));
    mmx_pwInput = (__m64*) pwInput;
    mmx_pwOffset = (__m64*) pwOffset;
    mmx_pfScale = (__m128*) pfScale;
    mmx_pwOutput = (__m64*) pwOutput;
    if(pwInput == pwOutput)
    {
        //
        // Overwrite input with output. (This option is faster as
        // this function tends to be memory bandwidth limited -- at
        // least with pc100 memory.
        //
        // Process pwInputOutput array and pwInput array one cache
        // line / loop (Uses 2 cache lines/loop for pfScale)
        //
        for(i=0; i < nPoints/4; i += 4) // execute loop nPoints/16 times
                        // i increases by 4 on each iteration
                        // terminal condition (nPoints/16)*4
        {
            //
            // prefetch data for next loop
            //
            __mm_prefetch((const char*)&mmx_pwInput[i+4], _MM_HINT_NTA);
            __mm_prefetch((const char*)&mmx_pwOffset[i+4], _MM_HINT_NTA);
            __mm_prefetch((const char*)&mmx_pfScale[i+4], _MM_HINT_NTA);
            __mm_prefetch((const char*)&mmx_pfScale[i+6], _MM_HINT_NTA);
            mmx_pwOutput[i+0] =
    __mm_cvtps_pi16(__mm_mul_ps(__mm_cvtpi16_ps(__m_psubusw(mmx_pwInput[i+0],
mmx_pwOffset[i+0])),mmx_pfScale[i+0])); mmx_pwOutput[i+1] =
    __mm_cvtps_pi16(__mm_mul_ps(__mm_cvtpi16_ps(__m_psubusw(mmx_pwInput[i+1],
mmx_pwOffset[i+1])), mmx_pfScale[i+1]));
            mmx_pwOutput[i+2] =
    __mm_cvtps_pi16(__mm_mul_ps(__mm_cvtpi16_ps(__m_psubusw(mmx_pwInput[i+2],
mmx_pwOffset[i+2])), mmx_pfScale[i+2]));
```

-continued

```
        mmx_pwOutput[i+3] =
_mm_cvtps_pi16(_mm_mul_ps(_mm_cvtpi16_ps(_m_psubusw(mmx_pwInput[i+3],
mmx_pwOffset[i+3])), mmx_pfScale[i+3]));
      }
  }
  else
  {
  //
  // More general case where output goes to separate array.
  // This option tends to be slower.
  //
  // Process pwInputOutput array and pwInput array one cache line / loop
  // (Uses 2 cache lines/loop for pfScale)
  //
  for(i=0; i < nPoints/4; i += 4)    //execute loop nPoints/16 times
           // i increases by 4 on each iteration
           // terminal condition (nPoints/16)*4
  {
  //
  // prefetch data for next loop
  //
  _mm_prefetch((const char*)&mmx_pwInput[i+4], _MM_HINT_NTA);
  _mm_prefetch((const char*)&mmx_pwOffset[i+4], _MM_HINT_NTA);
              _mm_prefetch((const char*)&mmx_pwOutput[i+4], _MM_HINT_NTA);
              _mm_prefetch((const char*)&mmx_pfScale[i+4], _MM_HINT_NTA);
              _mm_prefetch((const char*)&mmx_pfScale[i+6], _MM_HINT_NTA);
           mmx_pwOutput[i+0] =
  _mm_cvtps_pi16(_mm_mul_ps(_mm_cvtpi16_ps(_m_psubusw(mmx_pwInput[i+0],
  mmx_pwOffset[i+0])), mmx_pfScale[i+0]));
           mmx_pwOutput[i+1] =
  _mm_cvtps_pi16(_mm_mul_ps(_mm_cvtpi16_ps(_m_psubusw(mmx_pwInput[i+1],
  mmx_pwOffset[i+1])), mmx_pfScale[i+1]));
           mmx_pwOutput[i+2] =
  _mm_cvtps_pi16(_mm_mul_ps(_mm_cvtpi16_ps(_m_psubusw(mmx_pwInput[i+2],
  mmx_pwOffset[i+2])), mmx_pfScale[i+2]));
           mmx_pwOutput[i+3] =
  _mm_cvtps_pi16(_mm_mul_ps(_mm_cvtpi16_ps(_m_psubusw(mmx_pwInput[i+3],
  mmx_pwOffset[i+3])), mmx_pfScale[i+3]));
        }
    }
    _m_empty();
    //
    // If the number of points is not a multiple of 16, pick up the
    // remaining points.
    //
    for(i=16*(nPoints/16); i<nPoints; i++)
    {
       pwOutput[i+0] = (WORD)SATURATED_PRODUCT(SATURATED_DIFFERENCE(pwInput[i+0],
    pwOffset[i+0]), pfScale[i+0]);
       }
}
```

What is claimed is:

1. A method of processing raw images for display comprising the steps of:
   a first step of correcting the raw images with respect to an offset image to generate an offset corrected image; and
   a second step of adjusting a level of the offset corrected image with respect to a gain adjust to generate a gain corrected image;
   a third step of adjusting a window of the gain corrected image with respect to a reference window to generate an output image; and
   a fourth step of packing the output image into a register for display.

2. The method of claim 1 wherein the second step of adjusting includes employing saturation arithmetic to clip the level of the offset corrected image.

3. The method of claim 2 wherein the raw image comprises an N pixel sub-image, wherein the N pixel sub-image is divided into M sets of N/M pixels each, wherein N is an integer multiple of M, and wherein the first and second steps are applied to each of the M sets and the M sets are simultaneously processed in parallel by the first and second steps.

4. The method of claim 2 wherein single instruction multiple data (SIMD) instruction architecture is used and wherein the transformation exploits the SIMD architecture whereby branches to clip the offset corrected image are avoided with the saturation arithmetic.

5. The method of claim 1 wherein the raw image comprises an N pixel sub-image, wherein the N pixel sub-image is divided into M sets of N/M pixels each, wherein N is an integer multiple of M, and wherein the first through fourth steps are applied to each of the M sets and the M sets are simultaneously processed in parallel by the first through fourth steps.

6. The method of claim 5 wherein N equals 64 and M equals 4.

7. The method of claim 1 further comprising a fifth step after the fourth step of separately processing any bad pixels of the raw image.

8. The method of claim 1 wherein the second step of adjusting includes a linear transformation and wherein the third step of adjusting includes employing saturation to adjust the window.

9. The method of claim 1 wherein the raw images comprise x-ray images and wherein the offset image is an x-ray image corresponding to the absence of the x-rays.

10. The method of claim 1 wherein the gain adjust comprises a composite image acquired by calibration.

11. Computer readablemedium having software for performing the method of claim 1.

12. A system for processing raw images for display comprising a processor:
   correcting the raw images with respect to an offset image to generate an offset corrected image;
   adjusting a level of the offset corrected image with respect to a gain adjust by employing saturation arithmetic to clip the level of the offset corrected image to generate a gain corrected image;
   adjusting a window of the gain corrected image with respect to a reference window to generate an output image; and
   packing the output image into a register for display.

13. The system of claim 12 wherein the raw image comprises N pixel sub-image, wherein the N pixel sub-image is divided into M sets of N/M pixels each, wherein N is an integer multiple of M, and wherein the correcting, first adjusting, second adjusting and packing are applied to each of the M sets and the M sets are simultaneously processed in parallel by the processor.

14. The system of claim 13 wherein N equals 64 and M equals 4.

15. The system of claim 12 wherein the raw images comprise x-ray images and wherein the offset image is an x-ray image corresponding to the absence of the x-rays.

16. The system of claim 12 wherein the gain adjust comprises a composite image acquired by calibration.

17. The system of claim 16 further comprising separately processing any bad pixels of the raw image.

18. The system of claim 12 wherein single instruction multiple data (SIMD) instruction architecture is used to process the data through the processor and wherein the transformation exploits the SIMD architecture whereby branches to clip the offset corrected image are avoided with the saturation arithmetic.

19. The system of claim 12 wherein the first adjusting includes a linear transformation and wherein the second adjusting includes employing saturation to adjust the window.

20. The system of claim 12 including software for controlling the operation of the processor to perform the correcting, first adjusting, second adjusting and packing.

* * * * *